Figure 1:
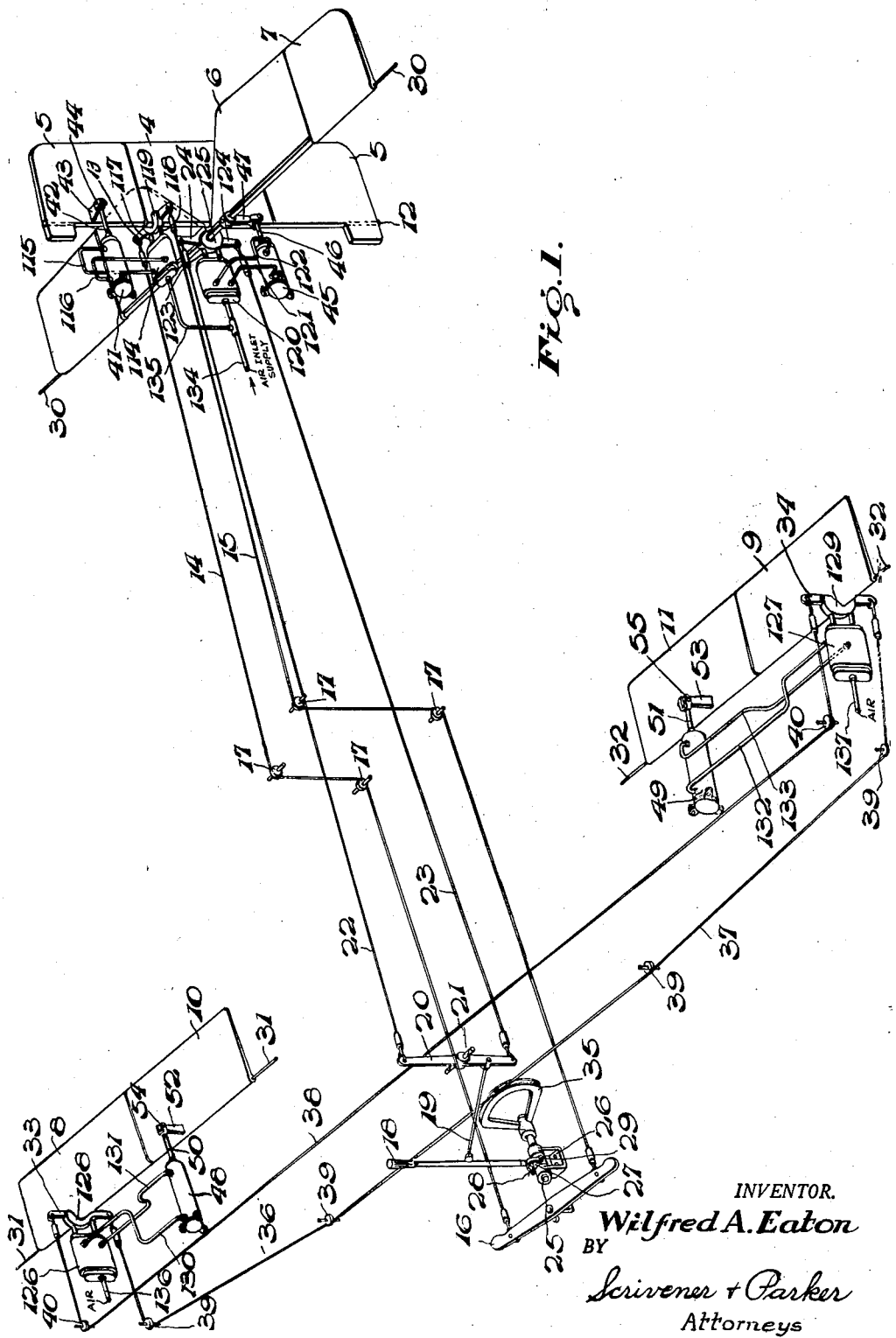

June 7, 1949.  W. A. EATON  2,472,653
FLUID PRESSURE CONTROL MECHANISM
Filed May 27, 1944  2 Sheets-Sheet 1

INVENTOR.
Wilfred A. Eaton
BY
Scrivener + Parker
Attorneys

June 7, 1949.  W. A. EATON  2,472,653
FLUID PRESSURE CONTROL MECHANISM
Filed May 27, 1944  2 Sheets-Sheet 2

INVENTOR.
Wilfred A. Eaton
BY
Scrivener & Parker
Attorneys

Patented June 7, 1949

2,472,653

UNITED STATES PATENT OFFICE 2,472,653

FLUID PRESSURE CONTROL MECHANISM

Wilfred A. Eaton, Elyria, Ohio, assignor to Bendix-Westinghouse Automotive Air Brake Company, Elyria, Ohio, a corporation of Delaware Application May 27, 1944, Serial No. 537,707

12 Claims. (Cl. 244—82.)

1

This invention relates to a remote control mechanism, and more particularly to fluid pressure operated mechanism for controlling the operation of a remotely positioned device.

In the operation of control surfaces for steering a body through a fluid medium, and particularly in connection with airplane operation, it has been found difficult in some cases to provide manual control mechanism for the rudder of an airplane which will permit the pilot to control the plane without exerting an excessive amount of force on the pilot's control element, and numerous servo or power operated mechanisms have been proposed to assist the pilot in moving such control surfaces. Most of the servo mechanisms proposed, however, have required lost motion connections of one sort or another between the pilot's control element and the airplane rudder in order to control the mechanism for supplying power to the rudder actuator, and this lost motion has rendered it difficult for the pilot to exercise a direct and sufficiently graduated control of the operation of the control surface, and it is accordingly an object of the present invention to provide combined manual and power operated means for controlling the rudder and other control surfaces of an airplane, or other vehicle, adapted to move in a fluid medium, so constituted as to overcome the above difficulties.

Another object of the invention is to provide in a mechanism of the above type, a control surface adapted to be directly controlled by the pilot through mechanical connections, together with another control surface which is entirely power operated, the mechanism being so constituted that the power supplied to operate the other control surface is controlled by the operation of the manually controlled surface.

Yet another object of the invention is to provide control mechanism for an airplane wherein a manually operated rudder is provided having sufficient area to safely control the operation of the airplane during normal flight conditions, together with a separate power operated control surface having sufficient area to permit satisfactory control of the airplane under all conditions of operation, the application of power to the auxiliary surface being controlled entirely by the operation of the manually controlled surface.

A still further object of the invention is to provide, in a system of the above type, control mechanism operated by the manually controlled surface for controlling the operation of the power controlled surface, this control mechanism being so constituted as to permit unimpeded operation

2 of the manually controlled surface by the pilot in the event of failure of the power supply.

These and other objects of the invention will be more readily apparent when taken in connection with the accompanying drawings wherein one form of the invention is illustrated. It is to be expressly understood, however, that the drawings are employed for purposes of illustration only, and are not designed as a definition of the limits of the invention, reference being had for this purpose to the appended claims.

Figure 2:
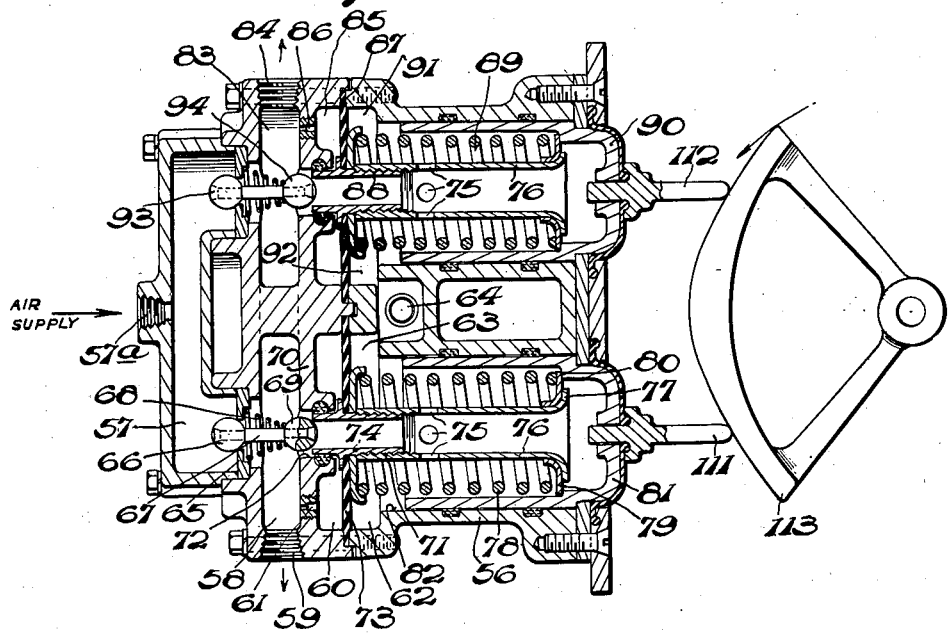
Figure 3:
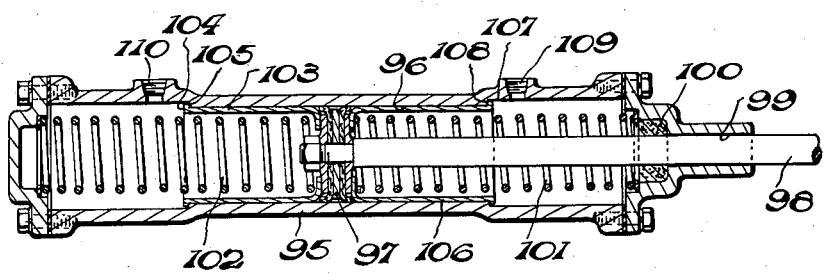

In the drawings, wherein similar reference characters are used to refer to similar parts throughout the several views, Fig. 1 is a diagrammatic view of a control system for the flying control surfaces of an airplane constructed in accordance with the principles of the present invention;

Fig. 2 is an illustration, partially in section, of one of the control valve mechanism and the means for operating the same, and Fig. 3 is a sectional view of a fluid actuator of the type used for effecting power operation of the various control surfaces.

Referring more particularly to Fig. 1 of the drawing, wherein a diagrammatic representation of the various control surfaces of an airplane is presented, the rear portion of the airplane, not shown, is provided with a manually operable rudder 4 and a pair of connected power-operated rudders 5, as well as with a pair of manually operable elevators 6 and a pair of power operated elevators 7. In order to control the lateral stability of the airplane, right and left manually operable ailerons 8 and 9 are provided, together with right and left power operated ailerons 10 and 11. The manual operation of the control surfaces is conventional, and to this end the rudder surface 4 is pivotally mounted on a shaft 12 which is pivotally mounted on the structure of the airplane, not shown, and which serves to connect the power operated surfaces 5 for rotation with the shaft. An operating bar 13 is rigidly connected with the surface 4 and the bar is adapted to be operated by means of control cables 14 and 15 which are connected respectively, as viewed by the pilot, with the right and left ends of a rudder bar 16, the cables being guided by suitable pulleys 17 in a manner well-known to those skilled in the art. Thus on movement of the rudder bar in a counterclockwise direction as viewed in the drawing, the cable 14 is effective through its connection with the bar 13 to move the rudder 4 in the same direction in order to steer the airplane to the right, movement of the rudder bar in the reverse direction serving to impart rotation in the reverse direction to the rudder. In like manner, a pilot's control element or stick 18 is provided and is adapted to control the operation of the manually operable elevators 6 through a connecting rod 19, a bar 20 pivotally mounted on the airplane by means of a pivot pin 21, the control cables 22 and 23 attached to the opposite ends thereof, and an operating bar 24 rigidly connected to the elevators 6 and connected at its upper and lower ends to the cables 22 and 23 respectively. The control element 18 is mounted for universal movement in any direction, this mounting including a shaft 25 arranged axially of the airplane structure and mounted for rotation in a bracket 26, together with a collar 27 mounted for rotation with the shaft and connected to a fork 28 formed on the lower end of the element 18 by means of suitable pivot pins 29. Thus on movement of the control element in a clockwise direction about the pivot pins, the rod 19 will act to turn the bar 20 in a counterclockwise direction, whereupon the cable 23 will serve to move the bar 24 in a similar direction in order to move the elevator in a counter clockwise direction about an elevator shaft 30 mounted on the airplane, it being pointed out that the elevators 6 are so mounted as to freely rotate on the shaft 30. The ailerons 8 and 9 are likewise mounted for free rotation on aileron shafts 31 and 32, the right aileron being provided with an operating bar 33 and the left aileron being provided with an operating bar 34. A quadrant 35 is keyed to the rear end of the control shaft 25, and the quadrant is connected with the bars 33 and 34 by means of cables 36 and 37. In order to provide for operation of the ailerons in both directions, the upper ends of the bars 33 and 34 are connected by means of a cable 38, it being note that the cables connected with the lower ends of the bars are guided by suitable guide pulleys 39 while the cable 38 is guided by pulleys 40. Thus on movement of the control element 18 to the right, as viewed by the pilot, the resulting tension on the cable 37 acts to move the aileron 9 in a clockwise direction, while the cable 38 is moved by the bar 34 to rotate the aileron 8 in the opposite direction, thus tending to lower the right side of the airplane, rocking of the airplane in the other direction about its longitudinal axis being accomplished by moving the control stick 18 to the left from neutral position.

In order to obtain power actuation of the rudders 5, both of which are rigidly connected to the shaft 12, a double acting fluid actuator or motor 41 is mounted on the structure of the airplane, not shown, a piston rod 42 in the motor being connected to an arm 43 carried by the rudder 5 by means of a suitable pivot pin 44. In like manner, a fluid actuator 45 is provided for operating the elevators 7, a piston rod 46 being connected to an arm 47 keyed to the elevator shaft 30. The power operated ailerons 10 and 11 are operated respectively by fluid actuators 48 and 49, these actuators being provided respectively with piston rods 50 and 51 pivotally connected to arms 52 and 53 on the respective ailerons by means of pivot pins 54 and 55.

All of the above motors are of the so-called double acting type, and control valve mechanism of the duplex type is provided for controlling respectively the rudder motor, elevator motor, and the aileron motors. Since these control valves are all of similar or identical construction, reference is had to Fig. 2 of the drawings for a more detailed construction of one of these valves, it being noted that the construction of these control valves in general is substantially the same as that shown in the patent to William J. Andres and Roy S. Sanford, No. 2,133,275, dated October 18, 1938. As shown particularly in Fig. 2, a casing 56 is provided with a pair of separately operable control valve mechanisms of the so-called self-lapping type, and since the right and left valve mechanisms are identical, the right mechanism will be described in some detail. The casing 56 is provided with an inlet chamber 57 adapted to be supplied with fluid pressure from a suitable source through an inlet port 57a, and referring now more particularly to the right hand portion of the valve, is further provided with an outlet chamber 58 having an outlet port 59, a diaphragm chamber 60 connected with the outlet chamber by means of a restricted passage 61, and an exhaust chamber 62 connected with atmosphere by means of a passage 63 and a port 64 formed in the housing. A ported partition 65 provides a passage between the inlet and outlet chambers, and communication between these chambers through the partition is normally prevented by means of an inlet valve 66 having an upwardly extending stem 67, normally maintained in the position shown by means of an inlet valve spring 68 interposed between the upper surface of the partition and the lower surface of an exhaust valve 69 carried on the upper end of the valve stem. A partition 70 defines the upper end of the outlet chamber and a valve operating element 71 is slidably mounted in a bore 72 formed in the central portion of said partition. A pressure responsive diaphragm 73 is suitably carried by the housing and clamped to the valve operating element as shown, the diaphragm thus serving to separate the diaphragm chamber 60 from the exhaust chamber 62. The valve operating element is provided with a bore 74 connected at its upper end with the exhaust chamber through ports 75 formed in the wall thereof, and adapted at its lower end to communicate with the outlet chamber 58. An upwardly extending portion 76 of the valve operating element is provided with a flange 77, and a graduating spring 78 is interposed between the upper surface of the diaphragm and a washer 79 slidably mounted on the portion 76 and restrained against upward movement by the flange 77. The upper periphery of the washer 79 is in engagement with a shoulder 80 formed on a valve operating plunger 81 slidably mounted in a vertical bore 82 formed on the housing, the result being that on downward movement of the plunger, the graduating spring is compressed and imparts force to the diaphragm to move the latter and valve operating element downward, whereupon the lower end of the bore 74 engages the upper surface of the exhaust valve 69 to prevent communication between the outlet chamber and atmosphere through the bore 74, the ports 75, the exhaust chamber 62, the passage 63 and the exhaust port 64, further downward movement of the element serving to open the inlet valve in order to establish communication between the inlet chamber and the outlet chamber. The pressure of the fluid thus supplied to the outlet chamber 58 is supplied to the diaphragm chamber 60 through the restricted passage 61, and the fluid in the diaphragm chamber thus eventually exerts sufficient upward force to overcome the downward force exerted on the diaphragm by the graduating spring, whereupon the valve operating element is moved up by the diaphragm in order to permit closing of the inlet valve by the action of the inlet valve spring 68. In the event an excessive amount of pressure has been momentarily supplied to the outlet chamber 58, the valve operating element will be moved upward sufficiently by the diaphragm to permit exhaust of the excess pressure by the exhaust valve and through the bore 74 in the element. The valve mechanism described is thus of the so-called self-lapping type, and the pressure in the outlet chamber is at all times substantially proportional to the degree of compression of the graduating spring. In like manner the left hand portion of the valve is provided with an outlet chamber 83 having an outlet port 84, a diaphragm chamber 85 connected to the outlet chamber by means of a restricted passage 86, a diaphragm 87, a valve operating element 88, a graduating spring 89, and a valve operating plunger 90 slidably mounted in the housing, an exhaust chamber 91 formed above the diaphragm being connected with the exhaust port 64 by means of a passage 92 formed in the housing. Similar inlet and exhaust valve 93 and 94 are provided, and it will be understood that on downward movement of the plunger 90, the graduating spring 89 is compressed in order to move the diaphragm and valve operating element to first close the exhaust valve in order to prevent communication between the outlet chamber and atmosphere, and to thereafter open the inlet valve in order to permit the flow of fluid pressure from the inlet chamber to the outlet chamber. It will be further noted that the mounting of the graduating springs, as more fully explained in the above referred to Andres and Sanford patent, is such that the springs may be initially preloaded if desired in such a manner that initial operation of the valve plungers will result in an immediate increase in pressure in the corresponding outlet chamber, the degree of this pressure being determined by the degree of preloading of the graduating springs.

The fluid actuators or motors may be generally of the type illustrated more fully in Fig. 3, such motors comprising a casing 95 having a bore 96 and a piston 97 slidably mounted therein, the piston being provided with a piston rod 98 slidably mounted in a bore 99 formed in the right end of the casing, and the escape of fluid pressure between the piston rod and the bore being prevented by means of a suitable seal 100. The piston is preferably normally maintained in neutral position by means of suitable neutralizing springs 101 and 102 interposed between the casing and the right and left surfaces of the piston respectively, and in the construction shown, means are further provided for preloading these springs initially to a degree comparable to the degree of preloading of the graduating springs in the control valves, the purpose of this preloading being to insure the definite maintenance of the piston in neutral position except when fluid pressure is supplied to the motor in order to move the piston in one direction or the other. To this end, a cage 103 is slidably mounted in the bore 96 with its right end abutting the left surface of the piston, movement of the cage to the right beyond the position shown being prevented by means of a flange 104 formed on the left end of the cage and a shoulder 105 formed in the left end of the bore and adapted to abut the flange. When this construction is used, the neutralizing spring is interposed between the left end of the cylinder and the right end of the cage, and it will be readily understood that the spring may be precompressed or preloaded to any desired degree during installation, and that the cage above described will prevent movement of the piston to the right beyond the position shown under the action of the preloaded spring, the right hand spring 101 is preloaded in a similar manner by means of a cage 106 slidably mounted in the bore of the cylinder, and prevented from further movement to the left by means of a flange 107 adapted to engage a shoulder 108 formed in the right end of the cylinder bore. The cylinder is provided with ports 109 and 110 which are adapted to receive fluid pressure from the respective control valves in order to control the operation of the fluid motor.

As indicated in detail in Fig. 2, operation of the right and left control valve mechanism is accomplished through push rods 111 and 112 carried by plungers 81 and 90 and adapted to engage a cam 113 which is connected for movement with the manually operable control surfaces. As indicated in the drawing, the cam is so shaped that counterclockwise movement of the cam will serve to depress the push rod 111 and operate the right hand valve mechanism to increase the pressure in the outlet chamber 58, while movement of the cam in a clockwise direction will permit the push rod 111 to remain in the position shown and will act to depress the push rod 112 in order to operate the left hand valve mechanism in a similar manner. Although the cam is preferably so shaped as to cause the pressure delivered by the respective valves to be substantially proportional to the angular movement of the cam from the neutral position shown, it will be understood that the cam may be given any desired shape in order to cause the pressure delivered by the valves to vary in any desired proportion to the degree of angular movement of the cam from neutral position.

Referring again to Fig. 1 of the drawings, and more particularly to the operation of the vertical rudders 4 and 5, it will be noted that a control valve 114 is provided for controlling the operation of the motor 41, and that the outlet chamber of the left hand portion of the valve is connected to the right end of the motor by means of a conduit 115, while the right hand portion of the valve mechanism is connected to the left end of the fluid motor through a conduit 116. The valve mechanism 114 is provided with operating plungers 117 and 118 adapted to engage a cam 119 formed on the bar 13, this cam having a shape similar to that of the cam 113 illustrated in more detail in Fig. 2. Thus on operation of the rudder bar in a counterclockwise direction, the rudder 4 is operated to steer the plane to the right as heretofore described, and the cam serves to depress the plunger 118 in order to cause the portion of the valve mechanism 114 controlled thereby to supply fluid pressure to the left end of the motor through conduit 116, the result being that the piston rod 42 is moved to the right and that the rudders 5 are moved in the same direction as the manually operated rudder 4, thus assisting the pilot in turning the plane to the right. On operation of the rudder bar in the reverse direction, reverse rotation is imparted to the bar 13 and in this event the plunger 117 is depressed to the left and the valve mechanism is operated to supply fluid pressure to the right end of the motor through the conduit 115, whereupon the piston rod is moved to the left and the rudders 5 are likewise rotated in the reverse direction with the shaft 12. Power operation of the elevators 7, under the control of the manually operable elevators 6, is accomplished in a similar manner, a duplex valve mechanism 120 being adapted to control the flow of fluid pressure to the right and left ends of the fluid motor 45 through conduits 121 and 122. The valve mechanism is provided with valve operating push rods 123 and 124, and these push rods are operated by a cam 125 formed on the manually operated bar 24. Thus on rotation of the bar in a counterclockwise direction, the lower portion of the valve is operated to supply fluid pressure to the left end of the motor 45, and the piston rod 46 is moved to the right in order to rotate the shaft 30 and the surface 7 in the same direction as the bar, reverse rotation of the bar serving to operate the valve mechanism to supply fluid pressure to the other end of the fluid motor in order to provide reverse rotation of the shaft 30 and the elevators 7. The power operated ailerons 10 and 11 are likewise controlled in a similar manner by means of duplex control valves 126 and 127 adapted to be operated respectively by cams 128 and 129 formed on the aileron operating bars 33 and 34. The valve 126 is connected with the fluid motor 48 by means of conduits 130 and 131, while the valve mechanism 127 is connected with the motor 49 through conduits 132 and 133. Since the manually operated ailerons 8 and 9 move at all times in opposite directions, it will be apparent that on clockwise rotation of the aileron 8, for example, the upper portion of the valve mechanism 126 will be operated to supply fluid pressure to the left end of the motor 48 through conduit 130 in order to move the piston rod 50 to the right to provide similar clockwise rotation to the power operated aileron 10, while the lower portion of the control valve mechanism 127 will be operated to supply fluid pressure to the right end of the motor 49 through conduit 133 in order to move the piston rod 51 to the left to effect counterclockwise rotation of the power operated aileron 11. A suitable supply of fluid pressure such as a compressor and reservoir, not shown, is provided on the airplane, and this fluid pressure is supplied to the valves 120 and 114 through conduits 134 and 135, and to the valve mechanisms 126 and 127 through conduits 136 and 137.

It will be readily apparent from the foregoing that the manually operated control surfaces 4, 6, 8 and 9 are at all times connected to the corresponding pilot's control elements through direct and substantially non-resilient cables, thus insuring complete control of these surfaces by the pilot at all times without unnecessary lost motion and without interference from the power operated portion of the mechanism. In addition to the above control, operation of each of the manually operable control surfaces serves to control the operation of a self-lapping control valve mechanism adapted to supply fluid pressure to a fluid actuator for the purpose of operating similar independently movable control surfaces in the same direction in order to further assist the pilot in controlling the direction of movement of the airplane. These power operated control surfaces are normally maintained in neutral position by means of the preloaded spring mechanism described in connection with Fig. 3, and the graduating springs of the various control valves are preloaded in such a manner that initial movement of the operating cams will result in an immediate supply of fluid pressure to the motor controlled by the valve being operated in a degree sufficient to overcome the preloading of the neutralizing springs in the motor in order to provide a control of the power operated surface which is immediately responsive to the operation of the manually operated portion of the system. The operating cams are so designed that the pressures supplied to the corresponding fluid motors are definitely proportioned to the degree of movement of the cams, and it should be understood that while these cams may be so designed as to cause the power operated surfaces to move through substantially the same angle as the corresponding manually operated surfaces when the airplane is operating at a predetermined speed, it is not essential that the system be designed in this manner. It is further pointed out that when the system is designed in this manner, a variation in speed of the airplane will result in the variation of force necessary to operate the power operated control surfaces, with the result that the angle of movement of the latter may differ from the angle of movement of the corresponding manually operated surfaces without affecting the efficient control of the direction of movement of the airplane by the pilot. In the event of failure of the power operated system, the power operated surfaces are maintained in neutral position by the preloaded springs in the corresponding motors, and the operator is free to move the manually operated surfaces in the usual manner without having to overcome any parasitic forces except those which are involved in operating the plungers of the control valves. Since failure of the supply of fluid pressure will prevent fluid pressure from being supplied to the diaphragm chambers of the valves, it is apparent that the only force necessary to operate the valve plungers will be that necessary to overcome the flexibility of the diaphragms and that necessary to overcome the tension of the inlet valve springs. It is contemplated that the manually operated surfaces may have sufficient area to permit a safe landing of the airplane to be made by the pilot in the event of failure of the power supply for the fluid motors, but that these surfaces may not be of sufficient area to insure complete maneuverability under all conditions of operation. Such maneuverability is provided by the addition of the power operated control surfaces, and at the same time, the pilot is not dependent on the power operated system for safe normal maneuverability of the airplane in the event of failure of the power supply. In addition to the foregoing, a substantially rigid connection is insured at all times between the various pilot's control elements and the surfaces controlled thereby, thus permitting the pilot to exercise a very precise control over the operation of the airplane. While the present invention has been described with particular reference to its operation in connection with an airplane, it will be understood that the system is readily adaptable to other vehicles, such as boats, for example.

While the invention has been illustrated and described herein with considerable particularity, it is to be understood that the same is not limited to the forms shown, but may receive a variety of mechanical expressions as will readily appear to those skilled in the art. Reference will, therefore, be had to the appended claims for a definition of the limits of the invention.

What is claimed is:

1. Mechanism for controlling the direction of movement of a body in a fluid medium including a manually operable control surface movably mounted on the body, a second control surface separately mounted on the body for movement independently of the first named surface, a power actuator for moving the second control surface, and means controlled by movement of the first named control surface relative to the body and independently of said second surface for controlling the supply of power to said actuator.

2. Mechanism for controlling the direction of movement of a body in a fluid medium including a manually operable control surface movably mounted on the body, a second control surface separately mounted on the body for movement independently of the first named surface, a power actuator for moving the second control surface, and means controlled by the movement of the first named control surface relative to the body and independently of said second surface for supplying power to the actuator to move the second control surface in the same direction as the manually operable surface.

3. Mechanism for controlling the direction of movement of a body in a fluid medium including a control surface movably mounted on the body, manual means for moving said surface relative to the body, a second control surface separately mounted for movement on the body independently of the first named surface, a fluid actuator for moving the second control surface, and means for supplying fluid pressure to the actuator to move the second control surface in the same direction as the first named surface including a valve controlled by relative movement of the first named surface and body and independently of the movement of said second surface.

4. Mechanism for controlling the direction of movement of a body in a fluid medium including a control surface movably mounted on the body, manual means for moving said surface relative to the body, a second control surface separately mounted for movement on the body independently of the first named surface, a power actuator for moving the second control surface, and means for supplying power to said actuator in a degree substantially proportional to the degree of movement of said first named surface relative to said body including power control means controlled by relative movement of said first control surface and body.

5. In a control mechanism for controlling the direction of movement in a fluid medium of a body of the type having a pair of independently movable control surfaces separately movably mounted thereon and manual means for moving one of said surfaces relative to the body, means for moving the other of said control surfaces including a power actuator, and means controlled by relative movement of said one surface and body for supplying power to said actuator in a degree substantially proportional to the degree of movement of said one surface.

6. In a control mechanism for controlling the direction of movement in a fluid medium of a body of the type having a pair of independently movable control surfaces separately movably mounted thereon and manual means for moving one of said surfaces relative to the body in either direction from a neutral position, means for moving the other of said control surfaces in either direction from a neutral position with a force substantially proportional to the degree of movement of said one surface from neutral position including a fluid actuator for moving said other surface, and valve means controlled by relative movement of said one surface and body for controlling the pressure of fluid supplied to said actuator substantially in accordance with the degree of said relative movement from neutral position.

7. In a control mechanism for controlling the direction of movement in a fluid medium of a body of the type having a pair of independently movable control surfaces separately pivotally mounted thereon and manual means for moving one of said control surfaces in either direction from a neutral position, means for moving the other of said control surfaces from a neutral position in the same direction as said one surface with a force substantially proportional to the degree of movement of said one surface from neutral position including a fluid actuator for moving said other surface in either direction, a pair of control valves operable to supply fluid pressure to the actuator to move said other surface in one or the other of said directions, and means for operating said valves in response to relative movement of said one surface and body, whereby the pressures supplied by said valves to said actuator are substantially proportional to the degree of movement of said one surface from neutral position.

8. The combination with a body having a pair of separately mounted and independently movable control surfaces for steering the body and manual means for moving one of said control surfaces in one direction or the other from a neutral position, of means for moving the other control surface in the same direction as said one surface with a force substantially proportional to the degree of movement of said one surface from neutral position including a fluid actuator for moving said other surface in either direction, a self-lapping control valve for supplying fluid pressure to the actuator to move said other surface in said one direction, a second self-lapping control valve for supplying fluid pressure to the actuator to move said other surface in said other direction, and means operable by all movements of said one surface in said one direction or in said other direction for correspondingly operating the first named valve or said other valve to supply fluid pressure to the actuator in a degree substantially proportional to the degree of movement of said one surface from neutral position.

9. In a control mechanism for controlling the direction of movement in a fluid medium of a body having a manually operable control surface movably mounted thereon, a second control surface separately mounted on the body for movement independently of the first named control surface, and a power actuator for moving the second control surface, power control means for supplying power to said actuator, and means controlled by movement of said manually operable control surface relative to the body for operating said power control means to supply power to said actuator to move said second control surface in the same direction as the manually operable surface with a force substantially proportional to the degree of movement of said manually operable surface.

10. In a control mechanism for controlling the direction of movement in a fluid medium of a body having a manually operable control element, a control surface movably mounted on the body and directly connected with the element for movement therewith, a second control surface separately mounted on the body for movement thereon independently of the first named control surface, and a double acting fluid motor for moving the second control surface, self-lapping valve means for supplying fluid pressure to the motor for moving the second control surface in either direction, and means operated by all movements of the first named control surface for operating said valve means to supply fluid to said motor at a pressure substantially proportional to the degree of movement of the first named control surface to move the second control surface in the same direction as the first named control surface.

11. In a control mechanism for controlling the direction of movement in a fluid medium of a body having a manually operable control surface movably mounted thereon and having a neutral position, a second control surface separately mounted on the body for movement independently of the manually operable surface, and a fluid motor for moving the second control surface, preloaded resilient means for normally maintaining the second control surface in neutral position with a predetermined force, and means operable on movement of the manually operable surface from neutral position for supplying fluid pressure to the motor to move the second control surface in the same direction as the manually operable surface including control valves, a valve operating element responsive to the pressure supplied to said motor, a valve operating device carried by said manually operable control surface, and a preloaded resilient connection between said element and device, whereby on initial movement of the manually operable surface from neutral position the valves are operated through said resilient connection to supply fluid to the motor at a pressure sufficient to substantially balance the predetermined force exerted by said resilient means, and on further movement are operated to supply fluid to the motor at a pressure substantially proportional to the degree of said further movement.

12. Mechanism for controlling an aircraft comprising a pair of separate control surfaces mounted independently of each other for separate movement about a common axis, manually operable means for pivotally moving one control surface in either direction about said axis, a power actuator for moving the other control surface in either direction about said axis, means for controlling the application of power to said actuator, and means actuated solely by said one control surface during movement thereof in either direction about said axis for operating said power controlling means.

WILFRED A. EATON.

REFERENCES CITED

The following references are of record in the file of this patent:

UNITED STATES PATENTS

| Number | Name | Date |
|---|---|---|
| 1,707,690 | Sperry | Apr. 2, 1929 |
| 2,003,930 | Fischel | June 4, 1935 |
| 2,133,275 | Andres et al. | Oct. 18, 1938 |
| 2,273,171 | Bennett | Feb. 17, 1942 |
| 2,277,378 | Wells | Mar. 24, 1942 |
| 2,346,820 | Casler et al. | Apr. 18, 1944 |
| 2,351,307 | Vorech | June 13, 1944 |

FOREIGN PATENTS

| Number | Country | Date |
|---|---|---|
| 219,569 | Switzerland | May 16, 1942 |